United States Patent
Casagrande et al.

(10) Patent No.: US 10,635,960 B2
(45) Date of Patent: Apr. 28, 2020

(54) RFID TRANSPONDER-BASED MODULE FOR COMMUNICATING INFORMATION TO A READING DEVICE

(71) Applicant: The Swatch Group Research and Development Ltd, Marin (CH)

(72) Inventors: Arnaud Casagrande, Bole (CH); Jean Gorisse, Neuchatel (CH); Jean-Luc Arend, Corcelles (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/181,552

(22) Filed: Nov. 6, 2018

(65) Prior Publication Data
US 2019/0188548 A1 Jun. 20, 2019

(30) Foreign Application Priority Data
Dec. 15, 2017 (EP) .................................... 17207598

(51) Int. Cl.
*G06K 7/08* (2006.01)
*G06K 19/07* (2006.01)
*G06K 7/10* (2006.01)

(52) U.S. Cl.
CPC ..... *G06K 19/0701* (2013.01); *G06K 7/10366* (2013.01); *G06K 19/0702* (2013.01);
(Continued)

(58) Field of Classification Search
CPC ........... G06K 19/0701; G06K 19/0702; G06K 19/0707; G06K 19/0716; G06K 19/0723; G06K 7/10366
See application file for complete search history.

(56) References Cited

U.S. PATENT DOCUMENTS

2002/0106988 A1 8/2002 Davie et al.
2003/0058108 A1* 3/2003 Fling .................... G01V 3/081
340/572.1
(Continued)

FOREIGN PATENT DOCUMENTS

EP 2 993 626 A1 3/2016
WO WO 2008/153242 A1 12/2008
(Continued)

OTHER PUBLICATIONS

European Search Report dated May 24, 2018 in European Patent Application 17207598.8, filed Dec. 15, 2017 (with English Translation of Categories of Cited Documents).
(Continued)

*Primary Examiner* — Thien M Le
(74) *Attorney, Agent, or Firm* — Oblon, McClelland, Maier & Neustadt, L.L.P.

(57) ABSTRACT

A transponder-based module is placed on a mobile object so as to transmit information in proximity to a reading device. The transponder-based module includes at least one energy source for supplying the transponder-based module, at least one sensor for performing measurements of a physical parameter, and a microcontroller linked to the measurement sensor for processing the measurements of the sensor. The module further includes a memory unit for storing the measurement data of the measurements performed by the sensor, a receiver of an interrogation signal from a reading device in proximity, and a transmitter for transmitting measurement data stored at ultra-high frequency and at very high bitrate subsequent to the reception of an interrogation signal from the reading device in proximity.

19 Claims, 2 Drawing Sheets

(52) U.S. Cl.
CPC ..... *G06K 19/0707* (2013.01); *G06K 19/0716* (2013.01); *G06K 19/0723* (2013.01)

(56) References Cited

U.S. PATENT DOCUMENTS

| | | | | |
|---|---|---|---|---|
| 2003/0058126 A1* | 3/2003 | Fling | .................. | G01V 3/08 340/853.8 |
| 2003/0058957 A1* | 3/2003 | Fling | .................. | G01V 3/081 375/295 |
| 2003/0058961 A1* | 3/2003 | Fling | .................. | G01V 3/08 375/316 |
| 2005/0281320 A1* | 12/2005 | Neugebauer | ........... | H04B 1/707 375/141 |
| 2006/0017545 A1* | 1/2006 | Volpi | .................... | G01S 13/751 340/10.4 |
| 2007/0035383 A1* | 2/2007 | Roemerman | ........ | G06K 7/0008 340/10.1 |
| 2016/0092706 A1 | 3/2016 | Deyle | | |
| 2017/0343695 A1* | 11/2017 | Stetson | ................. | G01V 3/101 |

FOREIGN PATENT DOCUMENTS

| | | |
|---|---|---|
| WO | WO 2014/121338 A1 | 8/2014 |
| WO | WO 2014/135920 A1 | 9/2014 |

OTHER PUBLICATIONS

European Search Report dated Apr. 16, 2019 in European Patent Application 18 20 6378 (with English Translation of Categories of Cited Documents), citing documents AO and AP therein.

\* cited by examiner

RFID TRANSPONDER-BASED MODULE FOR COMMUNICATING INFORMATION TO A READING DEVICE

CROSS-REFERENCE TO RELATED APPLICATION

This application claims priority to European Patent Application No. 17207598.8 filed on Dec. 15, 2017, the entire disclosure of which is hereby incorporated herein by reference.

TECHNICAL FIELD OF THE INVENTION

The invention relates to an RFID transponder-based module, which may be passive or semi-passive, for communicating information to a reading device.

The invention also relates to a system for communicating information with an RFID transponder-based module.

The invention also relates to a method of enabling the RFID transponder-based module for the transmission of information to a reading device.

BACKGROUND OF THE INVENTION

For the transmission of information, use is customarily made of an RFID communication between a transponder and a reader in particular via a near-field communication (NFC) or BLUETOOTH® connection. The transponder, which may be passive, is firstly awoken by a reader interrogation signal, and a rectifier in the transponder makes it possible to tap off, from the received signal, a supply voltage for the operation of the said transponder. Generally once awoken, the transponder can transmit for example a constant information item, which is an identification number of the transponder or of the product or object on which it is placed. This constant information item is therefore transmitted by the transponder on request of the RFID reader in communication.

In customary RFID transponders, the transmission of data or of the constant information item is effected with mean bitrates of the order of a few hundred kbits/s. This requires fairly lengthy transmission of data and therefore relatively significant consumption. This does not in principle allow the use solely of the energy tapped off from an external auxiliary source connected to the transponder circuit to allow sufficient power supply until all the data have been transmitted, thus constituting a drawback.

In the case of a connection via BLUETOOTH®, a synchronization with the reader is firstly performed. Also, an unwieldy communication protocol, which is complicated and a heavy consumer of current, is used. Therefore, it is not conceivable to use such a communication via BLUETOOTH® for a passive or semi-passive transponder powered by extracting energy from an external energy source, thus constituting a drawback.

A transponder or portable RFID device can be placed on an object in motion or a person or an animal. The transponder can comprise sensors for performing measurements of various physical parameters of the object or of the person or animal. These measurements can be transmitted to a reader or base station for remote processing or use of the measurements. However, the transponder or the portable RFID device must be powered via a sufficient energy source so as to be able to transmit the measurements performed without overly heavy consumption, this being difficult to carry out via a transponder or portable device of the prior art.

It is possible to cite patent application WO 2012/125425 A1, which describes a portable device, in the form of a patch, furnished with various sensors. This portable device can be placed on a person to determine, by way of several sensors, various physiological parameters of the person (biorhythms). The measurements performed can be stored and transmitted to a processing station, which manages the measurements performed by the portable device on the person for a medical checkup for example. The portable device comprises a battery to provide the power supply required in order to obtain the various measurements via the sensors. However, this portable device cannot operate without the supply battery and its consumption is not reduced so as to perform measurements periodically and to be able to transmit the stored information to the processing station rapidly, thus constituting a drawback.

SUMMARY OF THE INVENTION

The aim of the invention is therefore to provide an RFID transponder-based module for communicating information to a reading device alleviating the above-mentioned drawbacks of the prior art, and operating at low supply voltage so as to be able periodically to perform measurements via at least one sensor and transmit them rapidly when a reading device passes by.

For this purpose, the invention relates to an RFID transponder-based module intended to be placed on a mobile object and designed to transmit information in proximity to a reading device, on the basis of an interrogation signal transmitted by the reading device and received by the transponder-based module, the transponder-based module comprising:

at least one energy source for providing energy for the electrical power supply of the transponder-based module, at least one sensor for performing one or more measurements of at least one physical parameter, a microcontroller linked to the measurement sensor for receiving the measurement or measurements of the sensor, a memory unit for storing in at least one memory the measurement data of the measurement or measurements performed by the sensor (5) and processed in the microcontroller for their storage, a receiver designed to receive at least one interrogation signal from a reading device, when the transponder-based module is situated in proximity to a reading device, and a transmitter designed to transmit measurement data stored on the basis of the interrogation of a reading device, wherein the microcontroller is regulated by a low-frequency internal oscillator, which is an oscillator of RC or ring type, so as to regulate the measurements performed by the sensor over time, these measurements being stored in the memory unit with indication of the time of each measurement in a low power mode, and wherein the transmitter, once activated subsequent to the reception of an interrogation signal by the receiver of a reading device in proximity, is designed to transmit signals of measurement data stored at ultra-high frequency and at very high bitrate.

Particular forms of the RFID transponder-based module are defined in dependent claims 2 to 15.

An advantage of the transponder-based module according to the invention resides in the fact that it can be powered by extracting energy from an auxiliary energy source, so as to allow it to operate partially in order to perform measurements via at least one sensor and preferably via a certain number of sensors. The transponder-based module can thus remain powered continuously and perform measurements via the sensors so as to store the results of the measurements in a memory unit with at least one volatile memory. The sensors are linked to a microcontroller, which can be regulated by an oscillator with low consumption, such as an oscillator of the RC or ring type.

As soon as a communication can be established with a reader in proximity, all the measurement data can be transmitted at very high bitrate by a transmitter which is activated at least right from this instant and in a very short time span. The oscillator of the transmitter can be awoken upon reception of an interrogation and/or synchronization signal originating from the RFID reading device so as to regulate or clock the measurement data transmission operations. As soon as all the stored measurement data have been transmitted, the transmitter can be placed in an idle mode again.

For this purpose, the invention also relates to an information communication system, which comprises at least one transponder-based module and at least one reading device, wherein the transponder-based module is able to communicate measurement data stored in a memory unit of the transponder-based module at ultra-high frequency and at very high bitrate subsequent to the reception of an interrogation signal from a reading device in proximity.

For this purpose, the invention also relates to a method of enabling a transponder-based module in an information communication system, the method comprising the steps of:
performing several measurements over time via one or more sensors while being controlled by a microcontroller of the transponder-based module, which is powered continuously by an energy source,
storing all the measurement data processed by the microcontroller in a memory unit with indication of the time of each measurement in a low power mode,
receiving an interrogation signal from a reading device via the receiver of the transponder-based module, when it is situated in proximity to the reading device,
right from the reception of the interrogation signal, fully activating the transmitter at ultra-high frequency for the transmission of the measurement data stored at very high bitrate to the reading device in communication.

Particular steps of the method are defined in dependent claims 18 and 19.

BRIEF DESCRIPTION OF THE FIGURES

The aims, advantages and characteristics of an RFID transponder-based module for the communication of information, the communication system comprising it, and the method of enabling the RFID transponder-based module will become better apparent in the following description on the basis of at least one nonlimiting form of execution illustrated by the drawings in which.

DETAILED DESCRIPTION OF THE INVENTION

In the following description, the electronic components of an RFID transponder-based module for the communication of information to at least one reading device in proximity, and of the data communication system comprising it, which are well known to a person skilled in the art in this technical field, are described only in a simplified manner.

Figure 1:
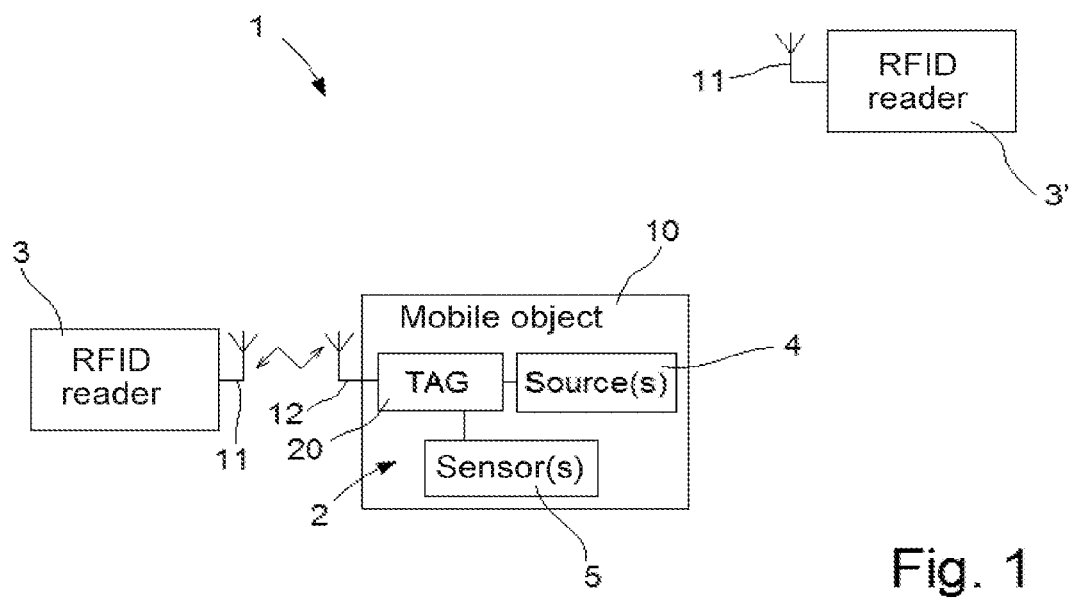
FIG. 1 is a simplified view of an information communication system with at least one transponder-based module and one or more reading devices for the high-bitrate communication of the information of the transponder-based module to the reading device in proximity according to the invention.

FIG. 1 represents a system for communicating data or commands 1. The system 1 mainly comprises at least one transponder-based module 2, which can be placed on a mobile object 10, such as a person or an animal, or a vehicle of any type, and one or more reading devices 3, 3' disposed in different locations over a defined zone. The locations of the reading devices 3, 3' can be sites in a public place, in a residence, in a shop, on a nature trail, in an urban zone or at diverse other sites.

The transponder-based module 2, for example placed on a person or an animal 10, can be of the passive or semi-passive type. According to the form of execution presented in FIG. 1, it comprises a transponder circuit 20, which can be personalized to the bearer of the transponder-based module 2, at least one power supply source 4 of the transponder circuit 20, and at least one measurement sensor 5.

The power supply source 4 is preferably an auxiliary energy source, which may be a solar cell, a thermoelectric generator (TEG), which is also known as a Seebeck generator, a magnetic induction circuit, a piezoelectric element or optionally a small battery. An extraction of energy from the backup or auxiliary energy source can be performed by the transponder circuit 20 in order to charge a charge accumulator so as to make it possible to supply voltage to the transponder circuit 20. A combination of several auxiliary energy sources 4 can be used to supply the transponder circuit.

Preferably, the transponder-based module 2 can comprise a set of sensors 5 linked to the transponder circuit 20. It is conceivable to use various sensors 5 to measure physiological parameters of the person or animal 10 (biorhythms), at least over determined time periods. The set of sensors 5 can comprise a temperature sensor, a pressure sensor, a pulsemeter, a magnetic sensor, an accelerometer, a gyroscope, an optical sensor or other types of sensor, depending on the application. The measurements performed by the sensors can be stored after sampling or analogue to digital conversion at least temporarily in at least one memory, as explained hereinafter with reference to FIG. 2.

With the auxiliary energy source or sources 4, the major part of the electronic components of the transponder circuit 20 and the sensors 5 can operate continuously, since their consumption is greatly reduced. On the other hand, when the transponder-based module 2 approaches a reading device 3 for example to less than 50 cm, this reading device 3 transmits, via at least one antenna 11, an interrogation and/or synchronization signal, at a carrier frequency of the order of 868 MHz for example, to the transponder-based module 2. The effect of this is to entirely activate all the electronic components of the said transponder-based module 2. In this fully activated state, the transponder-based module 2 can transmit via an antenna 12, a large part of the measurement data stored via a UHF transmitter destined for the reading device 3 under interrogation, which receives them via the antenna 11. Preferably, the entirety of the measurements performed by the sensors 5 related to the transponder circuit 20 are transmitted at very high bitrate, for example at a bitrate of the order of 26 Mbits/s and at ultra-high frequency of the order of 5.8 GHz.

It is noted that with transmission at very high bitrate and ultra-high transmission frequency, all the stored measurements originating from the sensors 5 can be transmitted very rapidly in a very short time of less than 1 s and without requiring high electrical consumption of the said transponder-based module 2. Once all the measurement data have been transmitted, the transmitter of the transponder circuit 20 can pass to an idle mode before a new interrogation of a reading device 3, 3'.

Such a transponder-based module 2 can be used to monitor the biorhythms of a person or of an animal 10 (mobile object) where the measurements performed by the sensors change continually. A reading device 3 can be disposed for example in a part of a house or in a garden or also in a cat flap if the animal is a cat, to tap off all the stored measurements of the sensors in operation. As the measurements of the sensors can be carried out at low voltage and low consumption, the transponder-based module 2 remains activated continuously for this part of the transponder circuit 20. The transmitter of the said module is still idle before the interrogation of the reading device 3 when the person or the animal, such as a cat for example in a cat flap, passes by. Each reading device 3, 3' can still be linked by cable or wirelessly to a central unit, such as a computer, for the management of all the measurement data.

Figure 2:
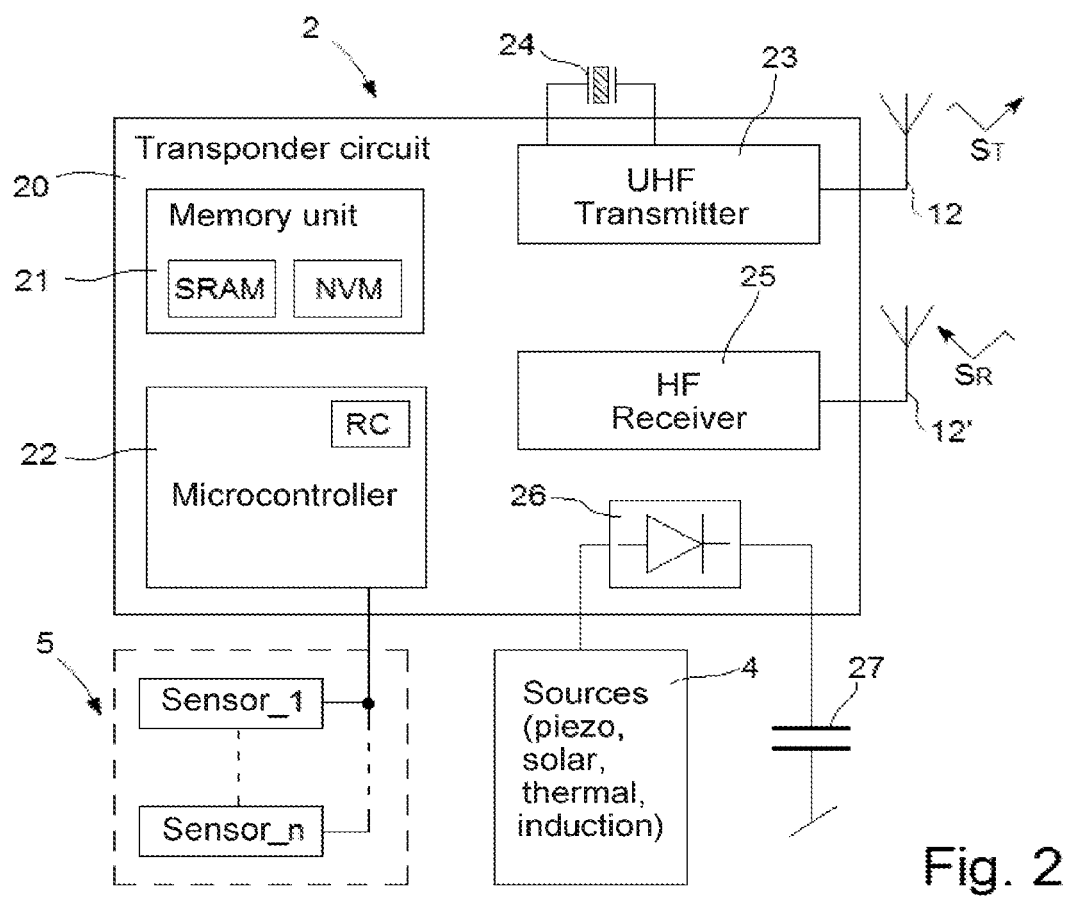
FIG. 2 represents a simplified block diagram of the electronic components of the RFID transponder-based module with the measurement sensor or sensors and the energy supply source or sources for powering the RFID transponder-based module according to the invention.

FIG. 2 represents the electronic components of the RFID transponder-based module 2 in greater detail for a better understanding of its manner of operation.

The transponder-based module 2 generally comprises a transponder circuit 20, at least one measurement sensor 5 and preferably a set of measurement sensors 5, and one or more energy sources, which can be auxiliary energy sources 4, from which energy can be extracted to supply power to the transponder circuit 20 and other parts of the transponder-based module 2.

The sensor or the n sensors Sensor_1 to Sensor_n are linked to a microcontroller 22, which is preferably regulated by a low-frequency clock, originating from a low-consumption oscillator, such as an oscillator of the RC type or a ring oscillator. The measurements performed by the sensors are converted digitally in the microcontroller so as to be stored in a memory unit 21 in defined positions. The converted measurement data are in principle stored in a volatile memory of the SRAM type, since this requires low consumption for storage in this type of memory. However, if the level of the supply voltage is sufficient, it is also conceivable to store these measurement data in a non-volatile memory such as a FLASH memory, which requires more consumption for information storage. Under these conditions, provision may be made to detect in the microcontroller the level of the supply voltage so as to know the type of memory in which the measurement data can be stored. Below a defined voltage threshold, the measurement data can be stored in the volatile memory, whilst above this voltage threshold the measurement data can be stored in the non-volatile memory NVM.

As indicated hereinabove, provision may be made for several auxiliary energy sources 4, or indeed also a small battery. The energy is extracted from these energy sources by a well-known extractor 26, which is represented in the transponder circuit 20 by a diode. An accumulator (capacitor) 27 at the output of the extractor is charged so as to make it possible to provide the supply voltage for the transponder circuit 20. However, in place of the accumulator, this may also entail a super-capacitor element if the auxiliary energy source is present permanently, like the vibrations of a motor, or a permanently lit hangar for example.

The transponder-based module 2 further comprises a receiver 25, which can be an HF high-frequency signals receiver 25 so as to receive high-frequency signals $S_R$ via a first antenna 12' originating from a reading device 3 under interrogation. A conventional rectifier, not represented, which can be in the HF signals receiver 25, is envisaged for rectifying the signals picked up and also for making it possible to provide the energy for the electrical power supply of the transponder-based module 2. The high-frequency signals can be signals at a carrier frequency of greater than 400 MHz, for example 434 MHz, 868 MHz or 916 MHz with a preference for the frequency of 868 MHz. The HF receiver 25 can remain idle in part or have certain reception parts activated permanently before signals conversion. These activated parts of the receiver consume only very little current as long as a conversion of reception signals is not being performed.

The transponder-based module 2 further comprises a transmitter 23 for transmitting, when it is activated, ultra-high frequency signals $S_T$ via a second antenna 12. This transmitter 23 is regulated by its own quartz oscillator 24, which can be at an oscillation frequency of the order of 26 MHz for example. As soon as interrogation signals are received by the receiver 25, the conversion of the signals picked up by the first antenna 12' can be performed in conjunction with the oscillator 24 of the transmitter 23 and a traditional frequency synthesizer.

It should further be noted that for wakeup and reception of signals of the transponder-based module 2, the receiver 25 may be able to pick up signals at low frequency of the order of 125 kHz or at high frequency of the order of 13 MHz (NFC) or greater than 400 MHz, for example 868 MHz. A conversion of the signals is performed on the basis of the RC oscillator of the microcontroller 22. Under these conditions, the receiver can remain permanently activated.

It is also conceivable to perform the wakeup of the transponder-based module 2 by any other means, such as by reception of an optical, infrared, ultrasonic or other signal.

Once the transponder-based module 2, borne by a mobile object, has approached to a short distance from a reading device for example just as for an NFC near-field communication, the reading device transmits an interrogation and/or synchronization signal to the transponder-based module 2, which detects it in proximity. From this instant, the transponder-based module 2 can fully activate the receiver 25 and the transmitter 23 with its oscillator 24 so as to allow it to transmit data signals $S_T$ at ultra-high frequency, for example at a carrier frequency above 2 GHz and preferably of the order of 5.8 GHz. All of the measurement data stored in the memory unit 21 and regulated by the RC oscillator of the microcontroller 22 are transmitted as soon as the transmitter is activated, the latter being able to transmit data at low power by virtue of its proximity to the reading device. The measurement data can be phase-modulated by offset quadrature phase-shift keying (OQPSK) and transmitted at very high bitrate, for example, at a bitrate of the order of 26 Mbits/s.

As each transponder-based module comprises an identification number personalized for example in respect of the person or the animal bearing it, the querying of several transponder-based modules in proximity to one and the same reading device can be permitted. There is no risk of collision of the measurement data transmitted by each activated transmitter in proximity to one and the same reading device.

The supply voltage used for operating the transponder-based module 2 can be less than 3 V, for example of the order of 0.6 V, while being extracted preferably from at least one auxiliary energy source 4. Once a communication with a reading device is performed, energy of the signals picked up in reception can be obtained via a rectifier so as also to supply electrical power to the transponder-based module 2.

According to the method of enabling the RFID transponder-based module 2 for the transmission of information to a reading device, provision is made to perform several measurements over time via the sensor or sensors 5 on the command of the microcontroller 22 of the transponder-based module 2. At least the microcontroller 22 and the sensors 5 can be activated periodically for the time of each measurement and in low-power mode for the remainder of the time by being powered by at least one auxiliary energy source 4 after extraction of energy and accumulation of charges on an accumulator 27, or a small battery. The various measurements performed by the sensors 5 are stored digitally in the volatile memory or the nonvolatile memory of the memory unit 21 with indication of the time of the measurement while being regulated by the low-frequency oscillator of the microcontroller 22. It may also be possible for the microcontroller 22 to perform a preprocessing of the measurements before recording them in the memory unit.

As soon as the transponder-based module 2 carried by the mobile object approaches to a defined short distance of detection from a reading device, the reading device transmits an interrogation and/or synchronization signal, which is picked up by the first antenna 12' of the receiver 25 of the transponder circuit 20 of the transponder-based module 2. From this instant, a synchronization of the transponder circuit 20 can be performed and a complete activation of the receiver and of the transmitter is performed. The stored measurement data are preferably completely transmitted at very high bitrate, for example greater than 10 Mbits/s and preferably of the order of 26 Mbits/s, by the second antenna 12 of the activated UHF transmitter 23. However, the first antenna and the second antenna may also constitute just a single dual-band antenna. Once all the measurement data have been transmitted with indication of the time periods of each measurement by taking account for example of the synchronization of the transponder circuit 20, at least the transmitter 24, or indeed a part of the receiver 25, are deactivated. The transmitter 24 and the receiver 25 remain placed in an idle mode until the moment of a new interrogation of a reading device when the transponder-based module 2 again approaches a reading device.

It should be noted that all the measurement data transmitted by the transponder-based module 2 can serve in a processing station for a medical checkup (biorhythm) or for tracking the mobility habits of the person or animal bearing the transponder-based module 2.

On the basis of the description which has just been given, several variant embodiments of the transponder-based module and of the communication system comprising it can be devised by the person skilled in the art without departing from the scope of the invention defined by the claims.

The invention claimed is:

1. A transponder-based module, comprising:
   at least one energy source configured to provide energy for an electrical power supply of the transponder-based module;
   at least one sensor configured to perform one or more measurements of at least one physical parameter;
   a microcontroller linked to the at least one sensor and being configured to receive and to process the one or more measurements of the at least one sensor;
   at least one memory configured to store measurement data of the one or more measurements performed by the at least one sensor and processed in the microcontroller for storage;
   a receiver configured to receive at least one interrogation signal from a reading device when the transponder-based module is situated in proximity to the reading device; and
   a transmitter configured to transmit the measurement data upon activation by receipt of the at least one interrogation signal when the transponder-based module is situated in proximity to the reading device,
   wherein the microcontroller is configured to be regulated by a low-frequency internal oscillator of RC or ring type, so as to regulate the one or more measurements performed by the at least one sensor over time, the measurement data being stored in the at least one memory with indication of a time of each of the one or more measurements while the transponder-based module is in an idle mode,
   wherein the transmitter, upon activation by receipt of the at least one interrogation signal, is further configured to transmit the stored measurement data at ultra-high frequency and at a bitrate greater than 10 Mbits/s, and
   wherein the transponder-based module is configured to be placed on a mobile object and to pass to the idle mode upon completion of transmitting the stored measurement data.

2. The transponder-based module according to claim 1, wherein the transmitter is configured to transmit all of the stored measurement data once the receiver has received the at least one interrogation signal from the reading device.

3. The transponder-based module according to claim 1, wherein the transmitter is configured to transmit the stored measurement data at a carrier frequency greater than 2 GHz.

4. The transponder-based module according to claim 1, wherein the transmitter is configured to transmit the stored measurement data at a carrier frequency of the order of 5.8 GHz.

5. The transponder-based module according to claim 1, wherein the transmitter is configured to transmit the stored measurement data via signals that are phase-modulated by offset quadrature phase-shift keying (OQPSK).

6. The transponder-based module according to claim 1, wherein the at least one energy source is an auxiliary energy source, which is a solar cell or a thermoelectric generator or a magnetic induction circuit or a piezoelectric element.

7. The transponder-based module according to claim 1, further comprising several auxiliary energy sources linked to an extractor of energy of the transponder-based module so as to accumulate charges in an accumulator or in a supercapacitor element to electrically and continuously supply power to the transponder-based module.

8. The transponder-based module according to claim 1, wherein the microcontroller is linked to the at least one memory, which comprises at least one volatile memory, and to the receiver and to the transmitter to form a transponder circuit.

9. The transponder-based module according to claim 1, further comprising several measurement sensors, each configured to perform one or more measurements of a respective physical parameter, and linked to the microcontroller for the storage of the measurement data in the at least one memory.

10. The transponder-based module according to claim 9, wherein the several measurement sensors are further configured to perform measurements of biorhythms of a person or of an animal, the person or the animal constituting the mobile object.

11. The transponder-based module according to claim 9, wherein the several measurement sensors are further configured to each perform several measurements over time, all of the measurements being stored in the at least one memory in defined positions.

12. The transponder-based module according to claim 1, wherein the receiver is further configured to receive one or more signals at a low frequency of the order of 125 kHz, or at a high-frequency of the order of 13 MHz or greater than 400 MHz.

13. The transponder-based module according to claim 12, wherein the receiver is further configured to receive an interrogation and synchronization signal originating from the reading device in proximity to the transponder-based module.

14. The transponder-based module according to claim 13, wherein the transmitter is further configured to be activated by receipt of the interrogation and synchronization signal and while being regulated by a quartz oscillator of frequency of the order of 26 MHz.

15. The transponder-based module according to claim 1,
wherein the at least one memory comprises a volatile memory and a nonvolatile memory, and
wherein, as a function of a level of a supply voltage, the microcontroller is configured to store the measurement data of the one or more measurements in the nonvolatile memory if the level of the supply voltage is greater than a defined threshold, and in the volatile memory if the level of the supply voltage is less than the defined threshold.

16. A system for information communication, which comprises at least one transponder-based module according to claim 1 and at least one reading device, wherein the transponder-based module is configured to communicate measurement data stored in at least one memory of the transponder-based module at ultra-high frequency and at a bitrate greater than 10 Mbits/s upon activation by receipt of at least one interrogation signal from the at least one reading device when the transponder-based module is situated in proximity to the reading device.

17. A method of enabling a transponder-based module according to claim 1, in a system for information communication, the method comprising:
performing several measurements over time via one or more sensors while being controlled by a microcontroller of the transponder-based module, which is powered continuously by an energy source;
storing all of the measurement data processed by the microcontroller in a memory with indication of a time of each measurement while the transponder-based module is in an idle mode;
receiving an interrogation signal from a reading device via a receiver of the transponder-based module, when the transponder-based module is situated in proximity to the reading device; and
upon receipt of an interrogation signal, fully activating a transmitter of the transponder-based module at ultra-high frequency for the transmission of the stored measurement data to the reading device in communication at a bitrate greater than 10 Mbits/s.

18. The method of enabling a transponder-based module according to claim 17, wherein the receiver of the transponder-based module receives an interrogation and synchronization signal from the reading device in proximity to the transponder-based module so as to synchronize the microcontroller and the stored measurement data.

19. The method of enabling a transponder-based module according to claim 17, wherein once the transmitter has transmitted all of the measurement data in a time span of less than 1 second to the reading device, the transponder-based module is deactivated and passed into an idle mode until a next interrogation signal by a reading device.

* * * * *